(12) United States Patent
Piry et al.

(10) Patent No.: US 9,311,088 B2
(45) Date of Patent: *Apr. 12, 2016

(54) APPARATUS AND METHOD FOR MAPPING ARCHITECTURAL REGISTERS TO PHYSICAL REGISTERS

(71) Applicant: ARM Limited, Cambridge (GB)

(72) Inventors: Frederic Claude Marie Piry, Cagnes-sur-Mer (FR); Louis-Marie Vincent Mouton, Vallauris (FR); Luca Scalabrino, Biot (FR); Richard Roy Grisenthwaite, Cambridgeshire (GB); David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 42 days.

This patent is subject to a terminal disclaimer.

(21) Appl. No.: 13/927,552

(22) Filed: Jun. 26, 2013

(65) Prior Publication Data

US 2014/0164742 A1 Jun. 12, 2014

Related U.S. Application Data

(63) Continuation of application No. 12/801,576, filed on Jun. 15, 2010, now Pat. No. 8,578,136.

(51) Int. Cl.
*G06F 9/30* (2006.01)
*G06F 9/38* (2006.01)
*G06F 9/455* (2006.01)

(52) U.S. Cl.
CPC .......... *G06F 9/30098* (2013.01); *G06F 9/3012* (2013.01); *G06F 9/384* (2013.01); *G06F 9/3838* (2013.01); *G06F 9/3861* (2013.01); *G06F 9/45558* (2013.01)

(58) Field of Classification Search
CPC ... G06F 9/384; G06F 9/3838; G06F 9/30098; G06F 9/3012
USPC .................................................. 712/216, 217
See application file for complete search history.

(56) References Cited

U.S. PATENT DOCUMENTS 6,092,175 A 7/2000 Levy et al.
6,314,511 B2 11/2001 Levy et al.

(Continued)

OTHER PUBLICATIONS

J. Liedtke, "Lazy Context Switching Algorithms for Sparc-like Processors" *GMD Technical Report No. 776*, Sep. 1993, pp. 1-36.

*Primary Examiner* — Benjamin Geib
(74) *Attorney, Agent, or Firm* — Nixon & Vanderhye, P.C.

(57) ABSTRACT

An apparatus and method are provided for performing register renaming. Available register identifying circuitry is provided to identify which physical registers form a pool of physical registers available to be mapped by register renaming circuitry to an architectural register specified by an instruction to be executed. Configuration data whose value is modified during operation of the processing circuitry is stored such that, when the configuration data has a first value, the configuration data identifies at least one architectural register of the architectural register set which does not require mapping to a physical register by the register renaming circuitry. The register identifying circuitry is arranged to reference the modified data value, such that when the configuration data has the first value, the number of physical registers in the pool is increased due to the reduction in the number of architectural registers which require mapping to physical registers.

14 Claims, 8 Drawing Sheets

(56) References Cited

U.S. PATENT DOCUMENTS

| | | |
|---|---|---|
| 6,625,746 B1 | 9/2003 | Moore |
| 6,629,233 B1 | 9/2003 | Kahle |
| 7,007,271 B2 | 2/2006 | Kumar et al. |
| 7,065,631 B2 * | 6/2006 | Weaver .................. 712/217 |
| 7,127,592 B2 | 10/2006 | Abraham et al. |
| 7,590,826 B2 | 9/2009 | Begon et al. |
| 7,624,253 B2 | 11/2009 | Begon et al. |
| 7,822,948 B2 | 10/2010 | Lewis |
| 8,041,754 B1 | 10/2011 | Marr |
| 8,335,912 B2 | 12/2012 | Golla et al. |
| 2010/0274961 A1 | 10/2010 | Golla et al. |
| 2010/0274993 A1 | 10/2010 | Golla et al. |

\* cited by examiner

| R0 | R0 | R0 |
|---|---|---|
| R1 | R1 | R1 |
| R2 | R2 | R2 |
| R3 | R3 | R3 |
| R4 | R4 | R4 |
| R5 | R5 | R5 |
| R6 | R6 | R6 |
| R7 | R7 | R7 |
| R8 | R8 | R8 |
| R9 | R9 | R9 |
| R10 | R10 | R10 |
| R11 | R11 | R11 |
| R12 | R12 | R12 |
| R13 | R13_svc | SP_Hyp |
| R14 | R14_svc | ELR_Hyp |
| USR | SVC | HYP |

430

APPARATUS AND METHOD FOR MAPPING ARCHITECTURAL REGISTERS TO PHYSICAL REGISTERS

This application is a Continuation of application Ser. No. 12/801,576, filed Jun. 15, 2010, issuing as U.S. Pat. No. 8,578,136 on Nov. 5, 2013, the entire content of which are incorporated herein by reference.

BACKGROUND OF THE INVENTION

1. Field of the Invention

The present invention relates to an apparatus and method for mapping architectural registers to physical registers, this being a process commonly referred to as register renaming

2. Description of the Prior Art

It is known to provide data processing systems which incorporate register renaming mechanisms. In such systems, program instructions include register specifiers identifying particular architectural registers when viewed from a programmer's model point of view. Hence, from the programmer's model point of view, there are a finite set of architectural registers which can be specified by the program instructions.

In order to facilitate higher performance operation, such as for example support for out-of-order execution (either at issue or writeback) or long pipelines, it is known to utilise register renaming techniques, whereby a larger set of physical registers are actually provided by the data processing apparatus than the set of architectural registers present within the programmer's model of that data processing apparatus. This larger set of physical registers enables hazards such as write-after-write (WAW) hazards to be avoided.

Accordingly, whilst a program instruction may specify a particular architectural register to be used, register renaming mechanisms within the data processing apparatus map this architectural register to a physical register which can be different from the physical register to which another program instruction specifying the same architectural register is mapped. Thus, the execution of the two program instructions specifying the same architectural register may be facilitated by use of different physical registers within the data processing apparatus.

The register renaming mechanism of known systems keeps track of which physical registers have been mapped to which architectural registers, and the relative ordering of the program instructions within the original program flow so that the proper behaviour and processing results are ensured. Examples of known register renaming techniques are described for example in commonly owned U.S. Pat. No. 7,624,253 and U.S. Pat. No. 7,590,826, the entire contents of which are hereby incorporated by reference.

Considering the set of physical registers, some of those registers are required to provide a mapping for all of the architectural registers, whilst the remaining registers are available to the renaming engine to use with the aim of achieving better performance. For example, if there are 30 architectural registers and 56 physical registers, then 30 physical registers are required to maintain a view of the architectural registers, leaving 26 physical registers available to ease register contention, and accordingly achieve better performance.

In some instances, it would be desirable to increase the number of physical registers available for remapping, so as to allow for further performance improvements. However, design constraints, such as frequency or power consumption, put a constraint on the size of the set of physical registers, with any increase in the size of the set of physical registers increasing the area and power consumption of the design, and potentially impacting the frequency of the design.

One known technique for seeking to free up more physical registers for use by the renaming engine involves storing a logic zero value in a particular one of the physical registers, hereafter referred to as register zero. Then, for any architectural register having a null value, instead of using a dedicated physical register from the set of physical registers, the renaming engine simply maps that architectural register to register zero. Clearly if multiple architectural registers have a null value, then they can all be mapped to register zero, thereby increasing the pool of physical registers available for mapping by the register renaming engine. Accordingly, various prior art techniques recommend zeroing registers that are unused, so that they can be mapped by the renaming engine to register zero. For example, considering the earlier example of 30 architectural registers and 56 physical registers, if all of the architectural registers have their values initialised to zero, then following initialisation, all of the architectural registers can be mapped to register zero, hence leaving 55 physical registers in the pool of available registers. Then, as each register gets written to with a value, it will be mapped to another physical register.

However, such an approach does require the operating system or application to be modified to force the software to write a logic zero value to any unused registers. Accordingly, it would be desirable to provide a technique which enabled the pool of available physical registers to be increased without increasing the overall size of the set of physical registers, and without requiring modification of the operation system or applications to force a logic zero value to be written into unused registers.

SUMMARY OF THE INVENTION

Viewed from a first aspect, the present invention provides an apparatus for processing data, comprising: a set of physical registers for storing data; processing circuitry for executing instructions of an instruction set, the processing circuitry requiring access to said data when executing said instructions; register renaming circuitry for mapping from architectural registers of a set of architectural registers to physical registers of said set of physical registers, said set of architectural registers being registers as specified by said instructions and said set of physical registers being physical registers for use when executing said instructions; available register identifying circuitry, responsive to a current state of said apparatus, for identifying which physical registers of said set of physical registers form a pool of physical registers available to be mapped by said register renaming circuitry to an architectural register specified by an instruction to be executed; and configuration storage for storing configuration data whose value is modified during operation of the processing circuitry, such that when said configuration data has a first value, the configuration data identifies at least one architectural register of said set of architectural registers which does not require mapping to a physical register by the register renaming circuitry; the available register identifying circuitry being arranged to reference said configuration storage, such that when said configuration data has said first value, the number of physical registers in said pool is increased due to the reduction in the number of architectural registers which require mapping to physical registers.

The inventors of the present invention realised that when executing software on a processor, there are period of time where certain architectural registers are not used. Accordingly, the inventors developed a mechanism which would allow the processor to have a different view of the set of architectural registers at different times. In particular, configuration storage is provided for storing configuration data whose value can be modified during operation of the processing circuitry. When that configuration data takes a first value, this identifies a reduced set of architectural registers for which the processing circuitry needs to maintain a view, and accordingly identifies at least one architectural register which does not require mapping to a physical register by the register renaming circuitry. The configuration data is referenced during the register renaming process with the effect that when the configuration data has the first value, then the number of physical registers in the pool of physical registers available for mapping is increased due to the proportion of the physical registers that need to be reserved to provide a view of the architectural registers being reduced.

Such an approach has the benefit that it does not require an increase in the number of physical registers, thereby avoiding any associated increase in area and power consumption, etc. Further, it does not require the operating system or application programs to adopt any special behaviour, such as writing a logic zero value to any unused registers. The technique of the present invention can be used irrespective of whether other mechanisms such as the register zero mechanism are used or not.

There are a number of ways in which the configuration data may be modified during operation of the processing circuitry. In one embodiment, software executing on the processing circuitry consists of a plurality of hierarchical levels of software, and the processing circuitry modifies the configuration data in the configuration storage depending on the hierarchical level of software currently being executed. Accordingly, in such embodiments, the hardware modifies the configuration data based on the level of software currently executing on the hardware.

In one such embodiment, at least one predetermined architectural register used by a first hierarchical level of software stores a value which is redundant when the processing circuitry is executing software at a second hierarchical level of software. In such an embodiment, the processing circuitry may be arranged to set the configuration data to said first value when executing software at said second hierarchical level, so as to identify said at least one predetermined architectural register as not requiring mapping to a physical register by the register renaming circuitry. The processing circuitry will then modify the configuration data to a value other than said first value when executing software at said first hierarchical level. Hence, in such embodiments, it is realised that when the software is executing at the second hierarchical level, the view of the architectural registers that needs to be maintained by the processing circuitry can be reduced, since it is guaranteed that at least one predetermined architectural register will not be used. Accordingly, by setting the configuration data to the first value when executing software at the second hierarchical level, this can be used to identify to the available register identifying circuitry that that at least one predetermined architectural register does not require a mapping to a physical register, thereby resulting in an increase in the number of physical registers forming the pool of available physical registers. Further, when executing software at the first hierarchical level, the processing circuitry merely modifies the configuration data so that it no longer has the first value, thereby removing the restricted view of the architectural register set, and ensuring that the processing circuitry maintains a view of all of the architectural registers.

The first hierarchical level can take a variety of forms, but in one embodiment the first hierarchical level comprises a hypervisor level of software. Often such a hypervisor level of software is provided to enable the processing circuitry to execute hypervisor software to support the execution of at least one virtual machine on the processing circuitry, where each virtual machine comprises an operating system running one or more application programs. Such an approach enables the configuration of the hardware platform of the processing circuitry to be shielded from the operating system and associated application programs forming the virtual machine. Typically a number of levels of software will be provided in which the application programs and operating system run, with the hypervisor level of software then providing a more privileged level of software above those other levels of software.

There may be a number of architectural registers provided for the sole use of hypervisor software running in the hypervisor level. One or more of those registers may contain values which have no usefulness once control has transferred from the hypervisor level down to one of the underlying software levels. Such registers are registers which can be removed from the processing circuitry's view of the architectural registers when running software at the second hierarchical level. One particular example is where an exception link register is provided for use by software executing in the hypervisor level of software, with that exception link register being populated when entering the hypervisor level to identify an instruction address to return to when subsequently exiting the hypervisor level. Once the hypervisor level has been exited, then the current contents of that exception link register have no meaning, since any subsequent return to the hypervisor level will cause the contents of that exception link register to be updated. Accordingly, the exception link register provided for the hypervisor level of software can be removed from the processing circuitry's view of the architectural register set when executing software in a lower hierarchical level of software below the hypervisor level.

In an alternative embodiment, the configuration data in the configuration storage is selectively set to said first value to disable use of said at least one architectural register, and the processing circuitry is arranged, on detection of an instruction identifying an architectural register that is disabled by the configuration data, to initiate a trap mechanism to cause a predetermined routine to be performed. Such an approach may be useful where a particular software level is very rarely used, and hence an access to an architectural register provided for that software level is unlikely. By disabling the use of those architectural registers, the number of physical registers in the pool of available registers can be increased, and if in due course an instruction does seek to access one of those disabled architectural registers, then a trap mechanism can be initiated to resolve the execution of that instruction.

In one embodiment, the predetermined routine performed in response to the trap mechanism causes the configuration data to be modified to a value other than the first value before the processing circuitry executes the instruction that had caused the trap. By modifying the configuration data to a value other than the first value, this ensures that the processor's view of the architectural registers is returned to the full set or architectural registers, causing the register renaming circuitry to once again provide a mapping for the relevant architectural register.

In this alternative embodiment, a lazy context switching style of approach is used, where a trap mechanism is initiated whenever an access to a protected register is attempted. An example of a lazy context switching technique is described for example in the article "Lazy Context Switching Algorithms for Sparc-Like Processors" by J Liedtke, German National Research Centre for Computer Science (GMD), GMD Technical Report No. 776, September 1993. In lazy context switching approaches, registers are access protected to avoid saving and/or restoring them. In contrast, in accordance with the above alternative embodiment, the registers are marked as not being architectural any more, to allow an improvement in the number of physical registers available for register renaming. However, the registers need not themselves be access protected, and indeed in one embodiment any attempted access merely causes the trap mechanism to reinstate the register into the architectural set by changing the configuration data to a value other than the first value, whereafter the access can proceed.

It will be appreciated that if accesses to particular architectural registers are very rare, such an approach can enable significant performance gains to be achieved by the register renaming circuitry which outweigh the impact of needing to initiate trap mechanisms when instructions seek to identify those excluded architectural registers.

In one embodiment, software executing on the processing circuitry consists of a plurality of hierarchical levels of software, said set of architectural registers includes a plurality of banked architectural registers, such that a different architectural register in said plurality of banked architectural registers is specified dependent on the hierarchical level of the software being executed at the time the architectural register is specified. In one such embodiment, the configuration data in the configuration storage is selectively set to said first value to disable use of at least one banked architectural register.

In one such embodiment, the configuration data is selectively programmed to said first value by software executing at a higher hierarchical level than the hierarchical level associated with the at least one banked architectural register whose use is disabled by the programming of said configuration data to said first value. In one particular embodiment, this higher hierarchical level is the same hierarchical level that handles the trap mechanism initiated when an instruction identifying an architectural register that is disabled is encountered. In one particular embodiment, this higher hierarchical level is a hypervisor level of software or a monitor level of software existing above the levels used by the operating system and application programs. Hence, the hypervisor level of software may be used to program the configuration data to the first value, and to handle any trap subsequently initiated on detecting an instruction identifying an architectural register that is disabled by the configuration data.

In one embodiment, within one hierarchical level, a plurality of software modes of operation are provided, with at least one banked architectural register being provided for each software mode. In one particular embodiment, one of said software modes is a fast interrupt (FIQ) mode, and the configuration data is set to said first value to disable at least one banked architectural register associated with said fast interrupt mode. In practice, it has been found that in many implementations the banked FIQ registers are not used, indeed in some implementations a chip not even having the FIQ pin connected to an interrupt source. These registers are hence in some respect free, and represent an unused architectural resource not requiring mapping within the physical set of registers. By excluding such registers from the architectural set as viewed by the processing circuitry, the pool of available registers within the physical register set is increased, enabling the register renaming circuitry to achieve further performance improvements, without the need to increase the overall size of the set of physical registers.

Viewed from a second aspect, the present invention provides a method of operating an apparatus to map from architectural registers of a set of architectural registers to physical registers of a set of physical registers, said set of architectural registers being registers as specified by instructions of an instruction set and said set of physical registers being physical registers for use when executing said instructions, the method comprising: (i) responsive to a current state of said apparatus, identifying which physical registers of said set of physical registers form a pool of physical registers available to be mapped to an architectural register specified by an instruction to be executed; (ii) for said instruction to be executed, performing a register renaming operation to map each architectural register specified by the instruction to one of said physical registers from said pool; (iii) storing configuration data whose value is modified during operation of the apparatus, such that when said configuration data has a first value, the configuration data identifies at least one architectural register of said set of architectural registers which does not require mapping to a physical register; and (iv) at said step (i), referencing said configuration data, such that when said configuration data has said first value, the number of physical registers in said pool is increased due to the reduction in the number of architectural registers which require mapping to physical registers.

Viewed from a third aspect, the present invention provides an apparatus for processing data, comprising: a set of physical register means for storing data; processing means for executing instructions of an instruction set, the processing means requiring access to said data when executing said instructions; register renaming means for mapping from architectural register means of a set of architectural register means to physical register means of said set of physical register means, said set of architectural register means being register means as specified by said instructions and said set of physical register means being physical register means for use when executing said instructions; available register identifying means, responsive to a current state of said apparatus, for identifying which physical register means of said set of physical registers form a pool of physical register means available to be mapped by said register renaming means to an architectural register means specified by an instruction to be executed; and configuration means for storing configuration data whose value is modified during operation of the processing means, such that when said configuration data has a first value, the configuration data identifies at least one architectural register means of said set of architectural register means which does not require mapping to a physical register means by the register renaming means; the available register identifying means for referencing said configuration means, such that when said configuration data has said first value, the number of physical register means in said pool is increased due to the reduction in the number of architectural register means which require mapping to physical register means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
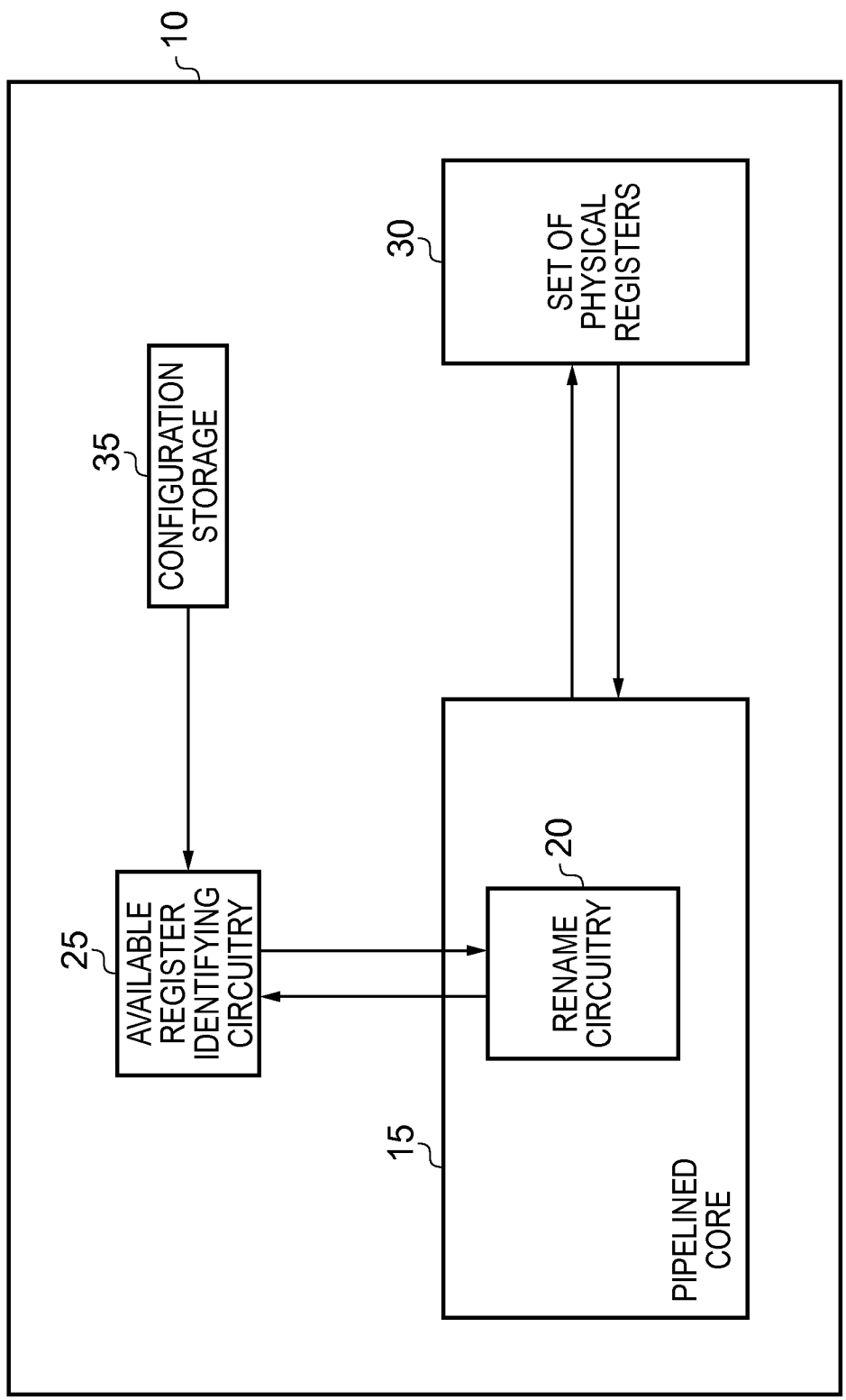
FIG. 1 is a block diagram of a data processing apparatus in accordance with a first embodiment.

FIG. 1 is a block diagram of a data processing apparatus 10 in accordance with one embodiment. The data processing apparatus 10 includes a pipelined processor core 15 which consists of a number of pipeline stages. In one embodiment, instructions are fetched from an instruction cache, and passed through a decode stage. Thereafter rename circuitry 20 within a rename stage of the pipeline is used to map architectural registers of an architectural register set to physical registers within a set of physical registers 30 provided by the data processing apparatus 10. The set of architectural registers form the registers that may be specified by instructions of the instruction set supported by the pipelined core 15, whilst the set of physical registers is a larger set of registers to which architectural registers can be mapped. By providing an enlarged set of physical registers and using renaming circuitry, it is possible to significantly improve performance, for example by supporting out-of-order execution, where the larger pool of physical registers enables various hazards to be avoided. Following the register renaming performed by the rename circuitry 20, the decoded instruction passes to an issue stage where it is issued to one of a number of execution pipelines, such execution pipelines including, for example, a multiply-accumulate pipeline, a floating point pipeline, a load/store pipeline, etc.

When performing the mapping operation to map architectural registers specified by an instruction to physical registers within the set 30, the rename circuitry 20 makes reference to available register identifying circuitry 25, which serves to provide an indication to the renaming circuitry 20 as to which physical registers within the set 30 are available to be used for mappings by the renaming circuitry between architectural registers and physical registers. As discussed earlier, the processor 15 needs to maintain a view of the various architectural registers, and this limits the number of physical registers in the set 30 which can form a pool of available registers for mapping. However, as will be discussed in more detail below, in accordance with the embodiment of FIG. 1, configuration storage 35 is provided for storing configuration data whose value is modified during operation of the processing circuitry to selectively reduce the number of architectural registers for which the processor core 15 needs to maintain a view, and thereby increase the number of physical registers available for mapping to architectural registers. In particular, the configuration data will during certain periods of operation be updated to identify at least one architectural register of the architectural register set which does not require mapping to a physical register by the register renaming circuitry 20.

The configuration data in the configuration storage 35 can take a variety of forms. For the purposes of a first described embodiment, it will be assumed that the configuration data takes the form of a flag which when set identifies a predetermined number of architectural registers which the processor no longer needs to maintain a view of, and which when cleared indicates that the processor needs to maintain a view of all architectural registers.

Figure 2:
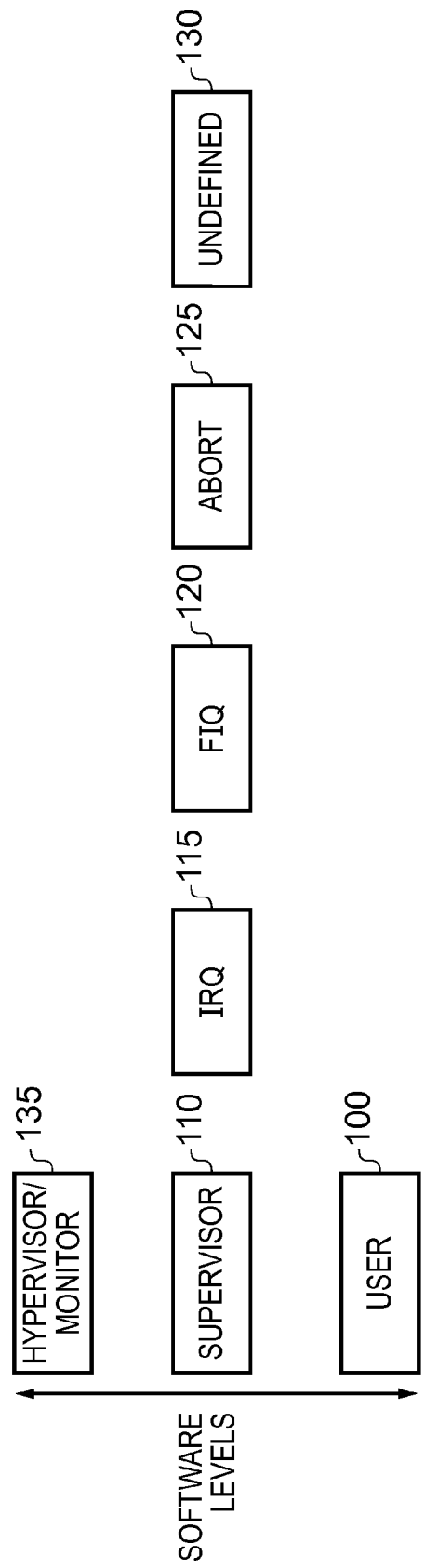
FIG. 2 schematically illustrates various levels of software that may be executed on the data processing apparatus of FIG. 1 in accordance with one embodiment.

As will be understood by those skilled in the art, the software executing on the processing circuit may consist of a plurality of hierarchical levels of software. For example, as shown in FIG. 2, application programs will typically execute at a user level 100. In addition, the operating system will typically operate at a higher software level, and in the example illustrated in FIG. 2 can operate in a number of different modes within that software level. The supervisor mode 110 is used when the operating system is performing general operating system functionality such as scheduling of tasks. The interrupt (IRQ) mode 115 is entered when an interrupt is received by the processor, whilst the fast interrupt (FIQ) mode 120 is entered when a particular high priority type of interrupt is received known as a fast interrupt. The abort mode 125 is entered when a memory management unit (MMU) provided in association with the core to manage accesses to memory determines that an application program is seeking to access an area of memory not permitted by that application program. Finally, the undefined mode 130 is entered if an instruction not having an allowed encoding is encountered within an application program. The operation of these various modes will be well understood by those skilled in the art, and so will not be discussed further herein.

In many systems, there will also be a level of software at a higher level than the operating system level. For example a monitor level of software may be provided for enabling the processing circuit to switch between different security configurations, which may also involve a switch in the operating system used by the hardware. Another example of a software level provided above the operating system level is a hypervisor level, where hypervisor software is executed to support the execution of multiple virtual machines on the processor hardware, each virtual machine comprising an operating system and one or more application programs. Such further levels of software are indicated schematically in FIG. 2 by the box 135.

Figure 3:
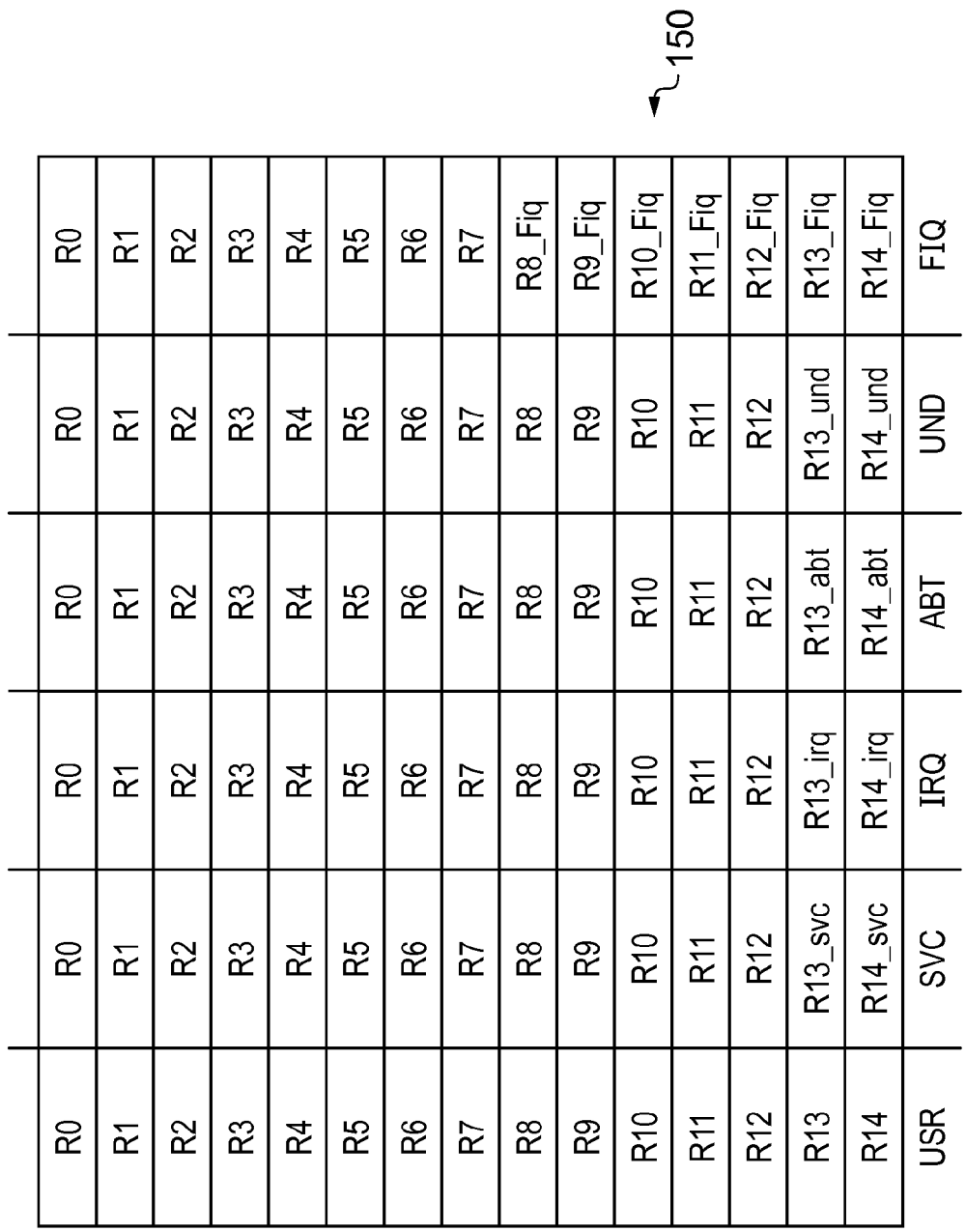
FIG. 3 schematically illustrates a set or architectural registers provided in accordance with a first embodiment.

When implementing the software levels illustrated in FIG. 2, it is often the case that the set of architectural registers will include a plurality of banked registers, as schematically illustrated in FIG. 3. In particular, as shown, when in the user software level 100 the software will have access to fifteen architectural registers R0 to R14. Register R13 may be used to store a stack pointer value, whilst register R14 is used as a link register to identify an instruction address to which execution is returned after completion of some given task. For example, a program is usually structured in functions. Some functions call other functions, which perform a given task and then return to the calling function, sometimes returning a value at the same time. In ARM assembly language, a function call is translated into a Branch and Link (BL) instruction. The BL instruction automatically updates R14 with the address of the instruction immediately following the BL instruction, in addition to forcing the program flow to execute instructions at the destination address. At the end of the called function, the return mechanism is implemented by copying the link register R14 into the program counter (PC), hence forcing execution of the instruction immediately after the BL instruction in program order.

The same mechanism is used when switching between software levels. For example, when an interrupt is received, register R14_irq is updated by the exception (the interrupt in this case) to identify an instruction address to which execution is returned when the interrupt mode is subsequently exited (i.e. when handling of the interrupt is completed).

It is typically the case that separate architectural registers for R13 and R14 will be provided for each of the user level and modes of the operating system level, as shown schematically in FIG. 3. Hence, by way of example, if an instruction executed by the operating system in the IRQ mode 115 specifies R13, this is actually specifying the architectural register R13_irq.

As will be seen from FIG. 3, whilst there are banked versions of the registers R13 and R14, in the supervisor mode 110, IRQ mode 115, abort mode 125 or undefined mode 130, the operating system still continues to use the architectural registers R0 to R12. However, for the FIQ mode 120, more banked registers are provided, in particular, only the general purpose registers R0 to R7 are reused, and dedicated R8 to R14 registers are provided for the FIQ mode.

FIG. 3 only shows the architectural registers used at the user level and operating system level. The hypervisor/monitor level 135 may also have some dedicated registers provided, but for the purposes of the current embodiment, these registers are not relevant.

In practice, many implementations do not use the FIQ mode 120, and accordingly the architectural registers R8_fiq to R14_fiq are very rarely used. The inventors of the present invention hence realised that these registers are in some respects free, and it is an undue restriction to require the processing circuitry to always maintain a view of these FIQ banked architectural registers. Accordingly, in one embodiment, software executing at the hypervisor/monitor level 135 may set the configuration flag in the configuration storage 35, the setting of this flag indicating to the available register identifying circuitry 25 that the processor no longer requires a view of the banked FIQ registers. This has the effect of increasing the pool of physical registers available for mapping by the rename circuitry 20 by an additional 7 registers, enabling further performance benefits to be realised by the rename circuitry without requiring any increase in the size of the set of physical registers 30. This is schematically illustrated by the FIGS. 4A and 4B.

Figure 4A:
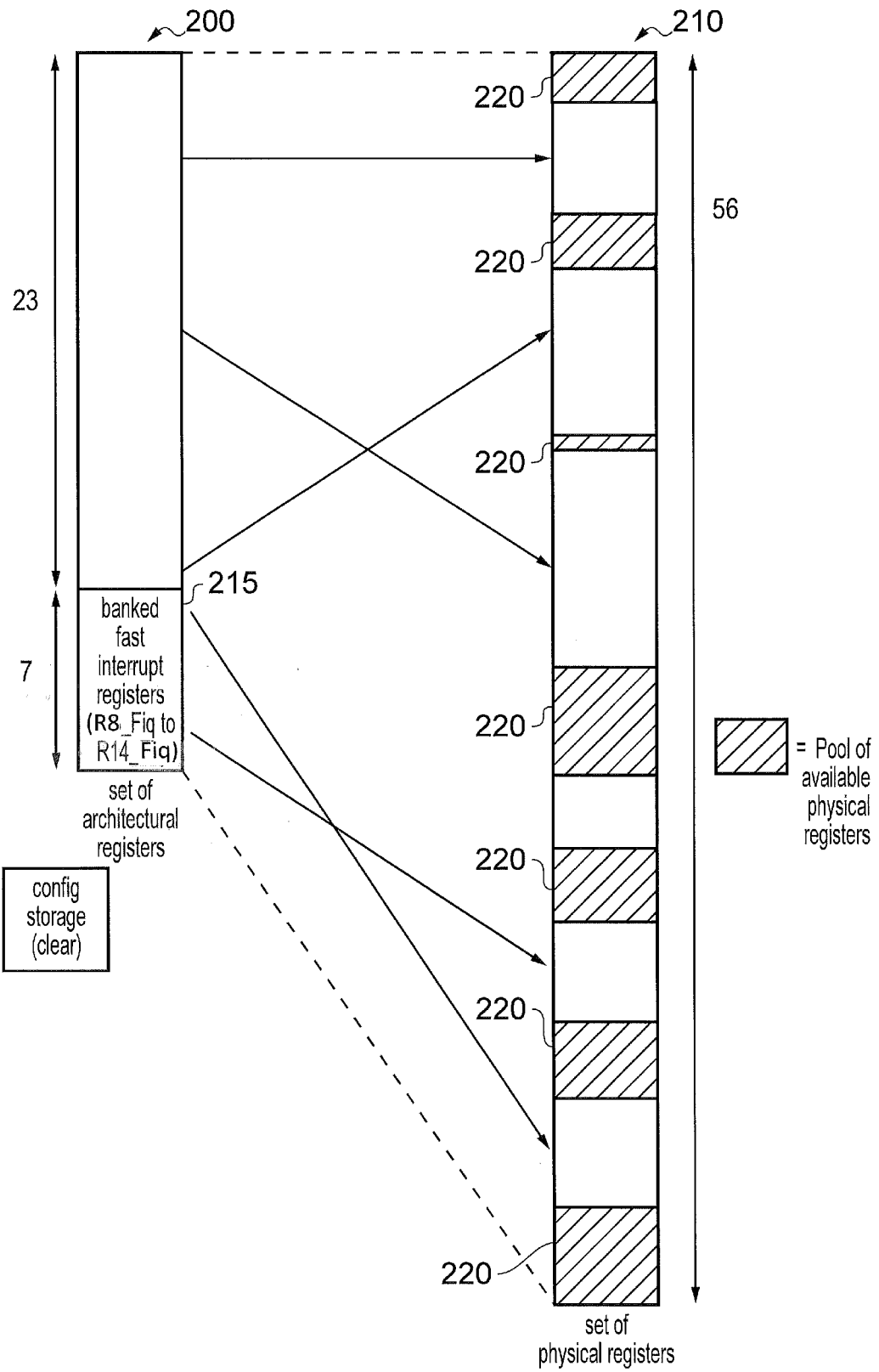
FIGS. 4A and 4B schematically illustrate how the architectural registers are mapped to physical registers, contrasting the situation when the configuration data is clear and the situation when the configuration data is set, in accordance with one embodiment.

In particular, FIG. 4A shows a set of 30 architectural registers 200, which via the renaming circuitry 20 are mapped to a set of 56 physical registers 210. When the configuration storage is clear, the processor needs to maintain a view of all of the architectural registers, including the 7 banked FIQ mode registers 215. The shaded blocks 220 schematically illustrate the pool of available physical registers within the set 210 after the rename circuitry 20 has nominally assigned physical registers for each of the architectural registers. In practice the number of physical registers within the availability pool will fluctuate up and down, but the renaming circuitry needs to be in a position to allocate a physical register for each architectural register.

Figure 4B:
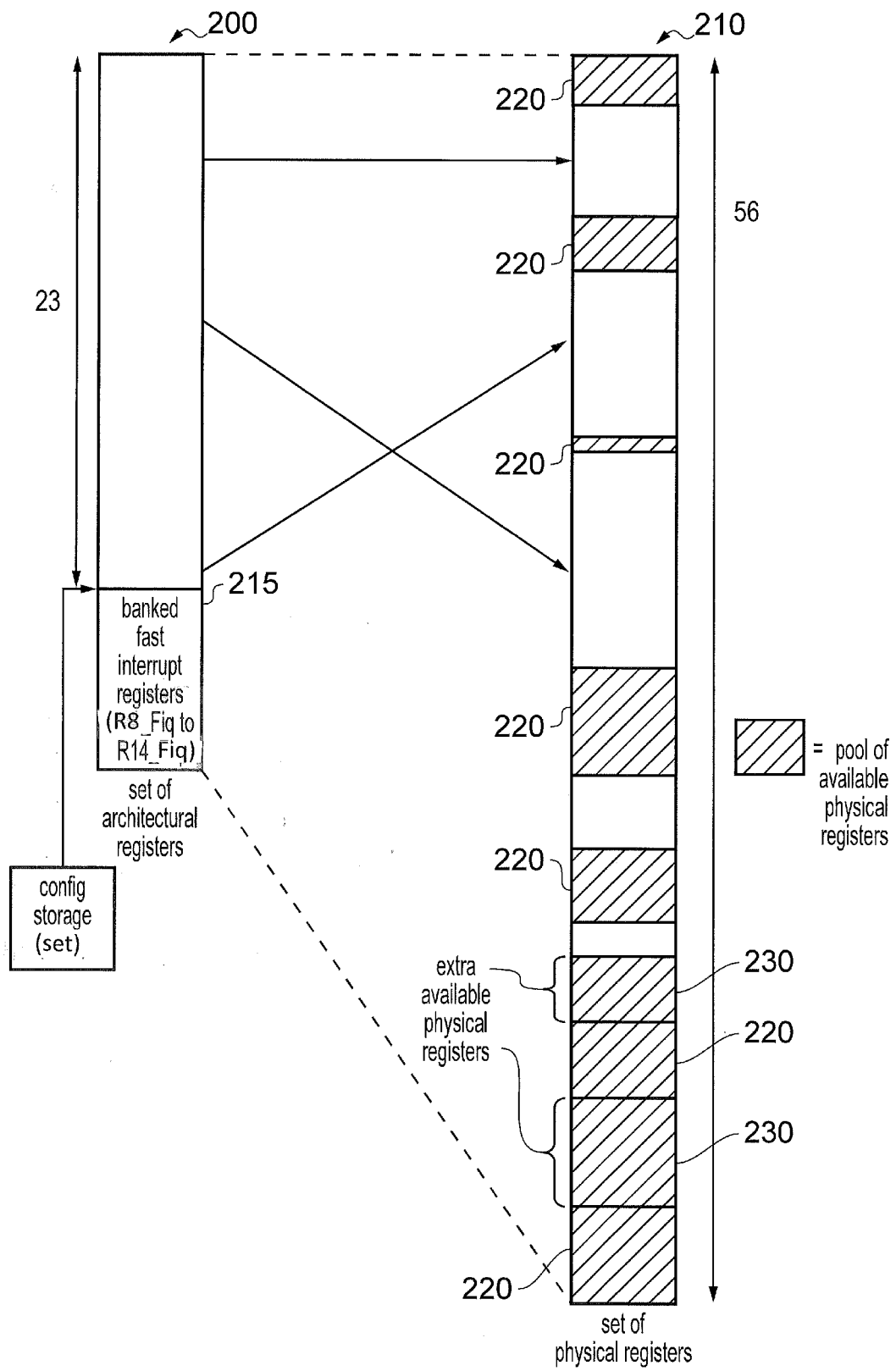
Figure 5:
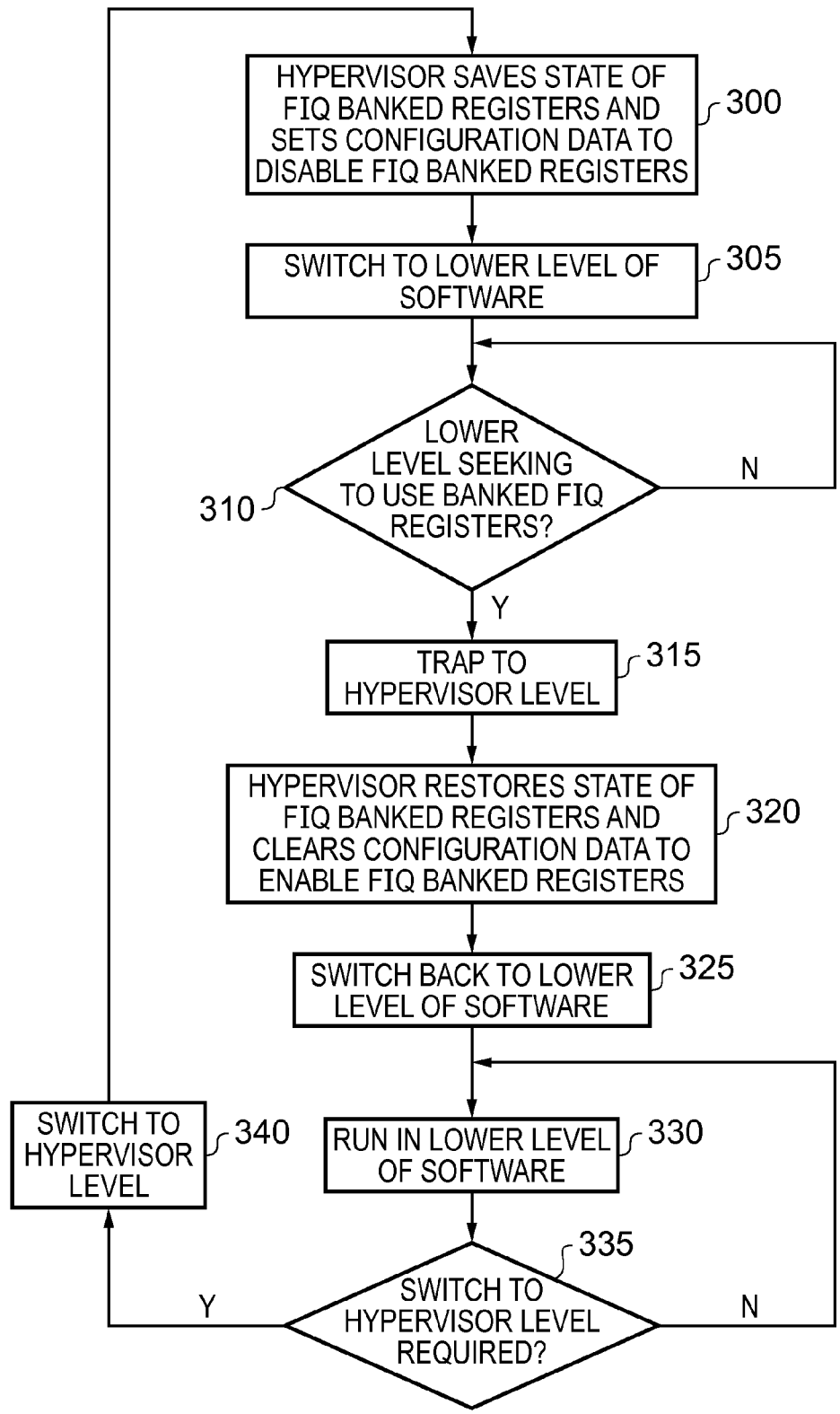
FIG. 5 is a flow diagram illustrating how the configuration data is set and cleared in accordance with one embodiment.

FIG. 4B then considers the situation where the configuration storage 35 has its configuration data set. This indicates to the available register identify circuitry 25 that the processor no longer needs to maintain a view of the banked FIQ registers 215. Accordingly, the renaming circuitry 20 only needs to be able to map the 23 remaining architectural registers to the 56 physical registers in the set 210. As schematically illustrated by the additional shaded boxes 230 in FIG. 4B, this increases the number of physical registers in the availability pool, thereby allowing the renaming circuitry 20 to further improve performance through the use of register renaming FIG. 5 is a flow diagram illustrating how the configuration data is set and cleared in accordance with the above described embodiment. At step 300, the hypervisor software saves the state of the FIQ banked registers to memory, and then sets the configuration data in order to disable the use of those FIQ banked registers. At this point, the pipelined core 15 no longer needs to maintain a view of those FIQ banked registers. Control then switches to a lower level of software at step 305, where the operating system and/or application programs perform a variety of processing operations. During this time, the architectural registers specified by the various instructions being executed are monitored, in order to detect a situation where an instruction executed by the lower level of software is seeking to use one of the banked FIQ registers, this monitoring process being illustrated schematically by the decision box 310. If such an instruction is encountered, then the process proceeds to step 315, where a trap is issued to the hypervisor level of software. Thereafter, at step 320, the hypervisor software restores the state of the FIQ banked registers from memory and clears the configuration data to enable reuse of those FIQ banked registers. Thereafter, control is switched back to a lower level of software at step 325.

The pipelined core 15 then continues to execute instructions (including the instruction that caused the trap at step 315) at that lower level of software at step 330, unless at step 335 it is determined that a switch to the hypervisor level is required. If the requirement for such a switch is detected, then the switch to the hypervisor level takes place at step 340, and the process returns to step 300, where in addition to performing whatever tasks are required as a result of the switch to the hypervisor level, the hypervisor level will again save the state of the FIQ banked registers to memory and set the configuration data to disable the further use of the FIQ banked registers.

In an alternative implementation, the hypervisor software could maintain a counter indicative of the number of times a trap has been issued to the hypervisor level due to instructions executed at a lower software level seeking to use the banked FIQ registers. If that counter reaches a predetermined value, then the functionality illustrated in FIG. 5 may be disabled, so that the hypervisor no longer seeks to disable use of the FIQ banked registers. This hence enables the functionality to be turned off in situations where the FIQ banked registers are in fact being used reasonably often.

Figures 6, 7:
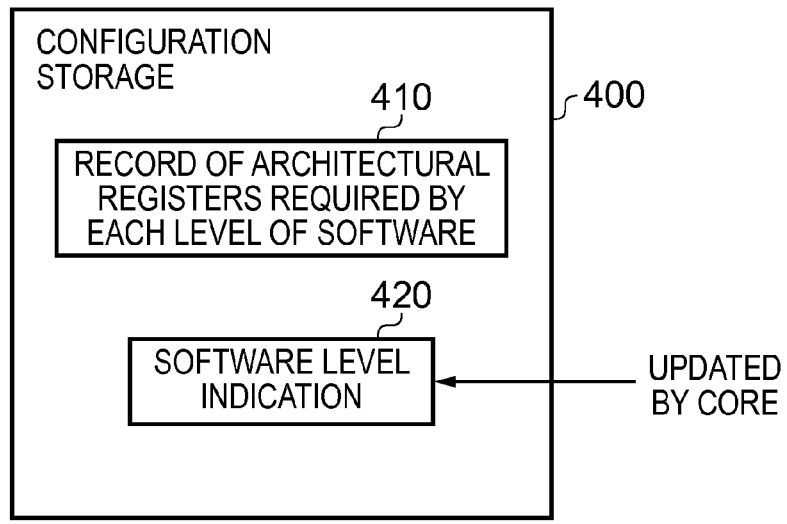
FIG. 6 illustrates an alternative form of configuration storage which may be utilised within the apparatus of FIG. 1 in accordance with an alternative embodiment.
FIG. 7 schematically illustrates a set of architectural registers in accordance with an alternative embodiment.

In an alternative embodiment, the configuration data no longer takes the form of a flag which is set to disable certain registers, but instead takes the form illustrated in FIG. 6. In particular, as shown in FIG. 6, the configuration storage 400 consists of a record of which architectural registers are required by each level of software, along with state information 420 indicating the current software level executing on the core. Whilst the data 410 is likely to be fairly static, the indication 420 is updated by the core as and when the software switches from one software level to another. If the architectural registers required by each software level are different, then the two pieces of information provided by the record 410 and the indication 420 can be used by the available register identifying circuitry 25 to selectively remove architectural registers from the view to be maintained by the processor.

An example of when such an approach can be used will be described with reference to FIG. 7 which illustrates the registers available at the user level, the operating system level and the hypervisor level. At the user level, registers R0 to R14 are used, whilst at the supervisor level 110 the operating system uses registers R0 to R12 and the banked registers R13_svc and R14_svc. As will be apparent from the earlier described FIG. 2, there may be other modes of operation at the operating system level in addition to the supervisor mode 110, but for the purposes of this embodiment this is not relevant. At the hypervisor level 135, the hypervisor software also uses the registers R0 to R12, but in addition has specific architectural registers SP_Hyp and ELR_Hyp. As with the other levels, the SP_Hyp register contains a stack pointer used by the hypervisor level, and the ELR_Hyp register identifies an instruction address to return to when exiting the hypervisor level of software.

Since there is only a single mode provided at the hypervisor level 135, it will always be the case that entry to the hypervisor level will reset the value in the ELR_Hyp register to identify the address that should be returned to when subsequently exiting the hypervisor mode. Accordingly, once the hypervisor level has been exited and control returned to one of the lower software levels, the current value stored in the ELR register is redundant. Accordingly, when executing software at a software level below the hypervisor level, the processor does not need to maintain a view of the architectural register ELR_Hyp.

It will be appreciated that in certain implementations there may be additional registers used solely by the hypervisor level which also exhibit a similar property, and accordingly can be excluded from the view of the architectural registers to be maintained by the processor core when operating at a software level below the hypervisor level.

Accordingly, the record of the architectural registers required by each level of software 410 will identify a reduced set of architectural registers for any levels below the hypervisor level, such that when the processor core updates the indication 420 to identify that the processor is not executing at the hypervisor level, this will cause the available register identifying circuitry 25 to increase the pool of available physical registers for mapping by the rename circuitry 20.

Figure 8:
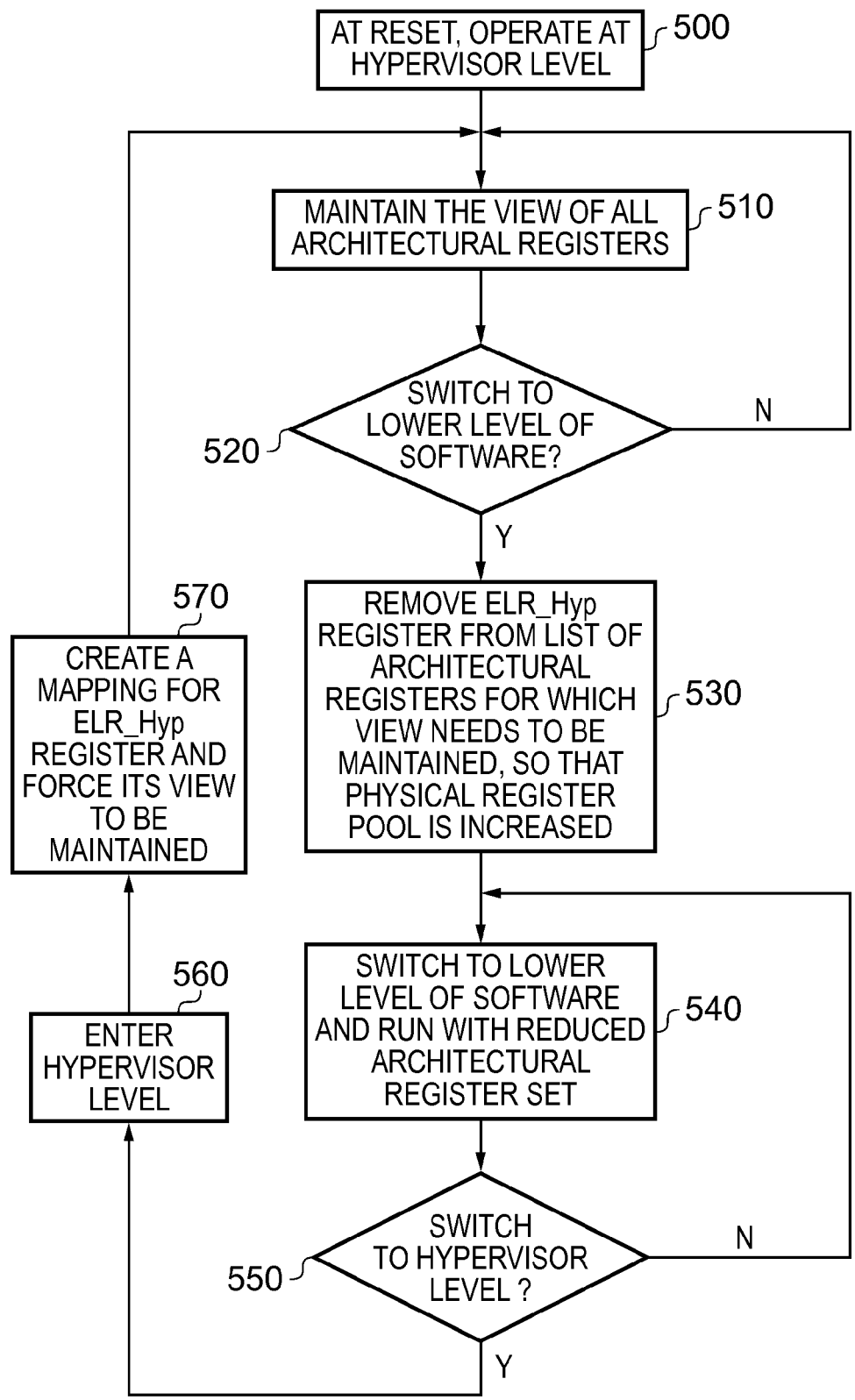
FIG. 8 illustrates how the configuration data is altered in accordance with the alternative embodiment in order to vary the view of the architectural registers as observed by the processor.

FIG. 8 is a flow diagram illustrating the operation of such an embodiment. At step 500, a reset operation occurs, during which software will be executed at the hypervisor level. Thereafter, at step 510, the information in the configuration storage 400 causes the available register identifying circuitry 25 to maintain a view of all of the architectural registers.

Thereafter, at step 520, it is determined whether a switch to a lower level of software is required, and when it is, the process proceeds to step 530 where the ELR_Hyp architectural register is removed by the available register identifying circuitry 25 from the list of architectural registers for which a view needs to be maintained, thereby increasing the size of the physical register pool of available physical registers. The available register identifying circuitry 25 does this in response to the configuration data in the configuration storage 400, triggered by the change in the software level indication 420 made by the core when entering the lower level of software.

Following step 530, execution is switched to a lower level of software and the processor then runs that software with a reduced architectural register set (step 540). If a switch to the hypervisor level is detected at step 550, then the process proceeds to step 560, where the hypervisor level is entered, and then at step 570 a mapping is created by the available register identifying circuitry 25 in combination with the rename circuitry 20 for the ELR_Hyp register so as to force its view to be maintained. Again, this process is triggered by the core updating the software level indication 420 to indicate that entry to the hypervisor level is being initiated. The process then returns to step 510.

From the above discussion of embodiments, it will be seen that such embodiments provide a mechanism for removing architectural registers from the view of a current software execution level. The benefit of doing this is that it permits physical registers to be used for other purposes (i.e. other than storing the state of the "removed" registers). For example, this would permit deeper speculation and having multiple versions of other architectural registers reside with the physical set of registers. More physical registers are needed the deeper you speculate, and accordingly by reducing the number of architectural registers for which a view needs to be maintained, the size of the pool of available physical registers within the physical register set increases, facilitating such deeper speculation.

In accordance with the described embodiments, one or more architectural registers are actually removed from the view of the current software execution level. One described way of achieving this involves the software, when trying to use such a disabled register, getting trapped to a supervisory software level, which can then reinstate the register and allow the software to continue. In an alternative embodiment, the removed registers simply do not exist for the software level currently executing.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Apparatus for processing data, comprising:
a set of physical registers for storing data;
processing circuitry configured to execute instructions of an instruction set, the processing circuitry requiring access to said data when executing said instructions;
register renaming circuitry configured to map from architectural registers of a set of architectural registers to physical registers of said set of physical registers, said set of architectural registers being registers as specified by said instructions and said set of physical registers being physical registers for use when executing said instructions;
available register identifying circuitry, responsive to a current state of said apparatus, configured to identify which physical registers of said set of physical registers form a pool of physical registers available to be mapped by said register renaming circuitry to an architectural register specified by an instruction to be executed; and
configuration storage configured to store configuration data whose value is modified during operation of the processing circuitry to identify a view of the set of architectural registers applicable to a current software execution level of the processing circuitry, such that when said configuration data has a first value, the configuration data identifies at least one architectural register of said set of architectural registers which is not present in said view of the set of architectural registers applicable to the current software execution level of the processing circuitry and does not require mapping to a physical register by the register renaming circuitry;
the available register identifying circuitry configured to reference said configuration storage, such that when said configuration data has said first value, the number of physical registers in said pool is increased due to the reduction in the number of architectural registers which require mapping to physical registers.

2. Apparatus as claimed in claim 1, wherein:
software executing on the processing circuitry consists of a plurality of hierarchical levels of software; and
the processing circuitry modifies the configuration data in the configuration storage depending on the hierarchical level of software currently being executed.

3. Apparatus as claimed in claim 2, wherein:
at least one predetermined architectural register used by a first hierarchical level of software stores a value which is redundant when the processing circuitry is executing software at a second hierarchical level of software;
the processing circuitry is arranged to set the configuration data to said first value when executing software at said second hierarchical level, so as to identify said at least one predetermined architectural register as not requiring mapping to a physical register by the register renaming circuitry; and
the processing circuitry is further arranged to modify the configuration data to a value other than said first value when executing software at said first hierarchical level.

4. Apparatus as claimed in claim 3, wherein said first hierarchical level comprises a hypervisor level of software.

5. Apparatus as claimed in claim 4, wherein said at least one predetermined architectural register comprises an exception link register populated when entering the hypervisor level of software to identify an instruction address to return to when subsequently exiting the hypervisor level of software.

6. Apparatus as claimed in claim 1, wherein:
the configuration data in said configuration storage is selectively set to said first value to disable use of said at least one architectural register; and
the processing circuitry is arranged, on detection of an instruction identifying an architectural register that is disabled by the configuration data, to initiate a trap mechanism to cause a predetermined routine to be performed.

7. Apparatus as claimed in claim 6, wherein said predetermined routine causes said configuration data to be modified to a value other than said first value before said processing circuitry executes said instruction.

8. Apparatus as claimed in claim 6, wherein:
software executing on the processing circuitry consists of a plurality of hierarchical levels of software;
said set of architectural registers includes a plurality of banked architectural registers, such that a different architectural register in said plurality of banked architectural registers is specified dependent on the hierarchical level of the software being executed at the time the architectural register is specified; and
the configuration data in the configuration storage is selectively set to said first value to disable use of at least one banked architectural register.

9. Apparatus as claimed in claim 8, wherein said configuration data is selectively programmed to said first value by software executing at a higher hierarchical level than the hierarchical level associated with the at least one banked architectural register whose use is disabled by the programming of said configuration data to said first value.

10. Apparatus as claimed in claim 8, wherein within one hierarchical level, a plurality of software modes of operation are provided, with at least one banked architectural register being provided for each software mode.

11. Apparatus as claimed in claim 10, wherein one of said software modes is a fast interrupt mode, and the configuration data is set to said first value to disable at least one banked architectural register associated with said fast interrupt mode.

12. Apparatus as claimed in claim 11, wherein said configuration data is programmed to said first value by a hypervisor level of software.

13. A method of operating an apparatus to map from architectural registers of a set of architectural registers to physical registers of a set of physical registers, said set of architectural registers being registers as specified by instructions of an instruction set and said set of physical registers being physical registers for use when executing said instructions on processing circuitry of the apparatus, the method comprising:
(i) responsive to a current state of said apparatus, identifying which physical registers of said set of physical registers form a pool of physical registers available to be mapped to an architectural register specified by an instruction to be executed;
(ii) for said instruction to be executed, performing a register renaming operation to map each architectural register specified by the instruction to one of said physical registers from said pool;
(iii) storing configuration data whose value is modified during operation of the processing circuitry to identify a view of the set of architectural registers applicable to a current software execution level of the processing circuitry, such that when said configuration data has a first value, the configuration data identifies at least one architectural register of said set of architectural registers which is not present in said view of the set of architectural registers applicable to the current software execution level of the processing circuitry and does not require mapping to a physical register; and
(iv) at said step (i), referencing said configuration data, such that when said configuration data has said first value, the number of physical registers in said pool is increased due to the reduction in the number of architectural registers which require mapping to physical registers.

14. Apparatus for processing data, comprising:
a set of physical register means for storing data;
processing means for executing instructions of an instruction set, the processing means requiring access to said data when executing said instructions;
register renaming means for mapping from architectural register means of a set of architectural register means to physical register means of said set of physical register means, said set of architectural register means being register means as specified by said instructions and said set of physical register means being physical register means for use when executing said instructions;
available register identifying means, responsive to a current state of said apparatus, for identifying which physical register means of said set of physical registers form a pool of physical register means available to be mapped by said register renaming means to an architectural register means specified by an instruction to be executed; and
configuration storage means for storing configuration data whose value is modified during operation of the processing means to identify a view of the set of architectural register means applicable to a current software execution level of the processing means, such that when said configuration data has a first value, the configuration data identifies at least one architectural register means of said set of architectural register means which is not present in said view of the set of architectural register means applicable to the current software execution level of the processing means and does not require mapping to a physical register means by the register renaming means;

the available register identifying means for referencing said configuration storage means, such that when said configuration data has said first value, the number of physical register means in said pool is increased due to the reduction in the number of architectural register means which require mapping to physical register means.

* * * * *